(12) United States Patent
Gustafsson et al.

(10) Patent No.: US 8,222,577 B2
(45) Date of Patent: Jul. 17, 2012

(54) METHOD OF TREATING A CRANKSHAFT

(75) Inventors: Reine Gustafsson, Landvetter (SE); Sture Alm, Hällekis (SE)

(73) Assignee: Wärtsilä Finland Oy, Vaasa (FI)

( * ) Notice: Subject to any disclaimer, the term of this patent is extended or adjusted under 35 U.S.C. 154(b) by 637 days.

(21) Appl. No.: 12/305,934

(22) PCT Filed: May 3, 2007

(86) PCT No.: PCT/FI2007/050244
§ 371 (c)(1),
(2), (4) Date: Jan. 26, 2009

(87) PCT Pub. No.: WO2007/147930
PCT Pub. Date: Dec. 27, 2007

(65) Prior Publication Data
US 2010/0012648 A1    Jan. 21, 2010

(30) Foreign Application Priority Data
Jun. 22, 2006   (FI) ..................................... 20065434

(51) Int. Cl.
*H05B 6/10* (2006.01)
*C21D 9/30* (2006.01)
(52) U.S. Cl. ........................ 219/639; 219/635; 148/572
(58) Field of Classification Search ............... 219/635, 219/639, 640, 641; 148/566, 567, 572
See application file for complete search history.

(56) References Cited

U.S. PATENT DOCUMENTS

| 3,689,828 | A | * | 9/1972 | Kurose et al. ................. 324/235 |
| 4,043,847 | A |   | 8/1977 | Just |
| 4,112,812 | A | * | 9/1978 | Wardwell et al. ............. 411/416 |
| 4,404,041 | A | * | 9/1983 | Akahori et al. ............... 148/542 |
| 5,714,114 | A | * | 2/1998 | Uehara ........................... 420/61 |
| 6,153,865 | A | * | 11/2000 | Storm et al. .................. 219/672 |
| 2005/0081378 | A1 |  | 4/2005 | Bustamante |

FOREIGN PATENT DOCUMENTS

| DE | 2913865 | 10/1980 |
| JP | 09014252 | 1/1997 |
| JP | 2004108873 | 4/2004 |
| RU | 2205714 | 6/2003 |

OTHER PUBLICATIONS

Asi et al: "Failure Analysis of a Crankshaft Made From Ductile Cast Iron" Engineering Failure Analysis, Pergamon, vol. 13, No. 8, Dec. 2006, pp. 1260-1267.

\* cited by examiner

*Primary Examiner* — Timothy J Dole
(74) *Attorney, Agent, or Firm* — Chernoff, Vilhauer, McClung & Stenzel

(57) ABSTRACT

Method for treating a crank pin of a crank shaft. In the method hardness of the crank pin surface is measured and when the hardness is over a predetermined limit value, depth of the hard spot is measured. Heat treatment parameters are determined at least on the basis of the depth measurement and the hard spot is heat treated. During the heat treatment the hard spot is heated by an induction heating device.

14 Claims, 2 Drawing Sheets

METHOD OF TREATING A CRANKSHAFT

This is a national stage application filed under 35 USC 371 based on International Application No. PCT/FI2007/050244 filed May 3, 2007, and claims priority under 35 USC 119 of Finnish Patent Application No. 20065434 filed Jun. 22, 2006.

The invention relates to a method of treating a crankshaft of a piston engine.

A big end bearing failure in an internal combustion engine causes heat build-up and consequently hardening of the crank pin material may occur. Repairing a damaged crankshaft can be very expensive and time-consuming. The hardened layer can be removed by re-machining the crank pin. However, since the hardened layer is normally quite thick and the hardened area wide, for example more than 50 per cent of the pin length, it may be possible that the hardness of the pin after the re-machining does not drop to the allowed level. Therefore, the entire crankshaft must often be changed as a result of a big end bearing failure.

The hardened crank pin can also be repaired by heat treating. In the heat treatment the crank pin is first heated to a suitable temperature and thereafter cooled. As a result the hardened material of the crank pin becomes softer.

It is an object of the present invention to provide an improved method for treating hardened areas or spots on the crank pin of the crankshaft.

According to the invention the object is achieved as set forth in claim 1.

According to the invention the hardness of the crank pin surface is measured, and when the surface hardness exceeds a predetermined limit value, the depth of the hardened spot or area is measured. Thereafter, the heat treatment parameters are determined at least on the basis of the depth measurement, and the hard spot or area heat treated. During the heat treatment the hard spot or area is heated by an induction heating device.

The invention offers significant benefits.

Because the depth of the hardened spot on the crankshaft is measured, the output power of the induction heating device and the heating time can be adjusted in an optimal manner to reduce the hardness of the hard spot or area.

In the following the invention is described in more detail by means of example according to the appended drawings.

Figure 1:
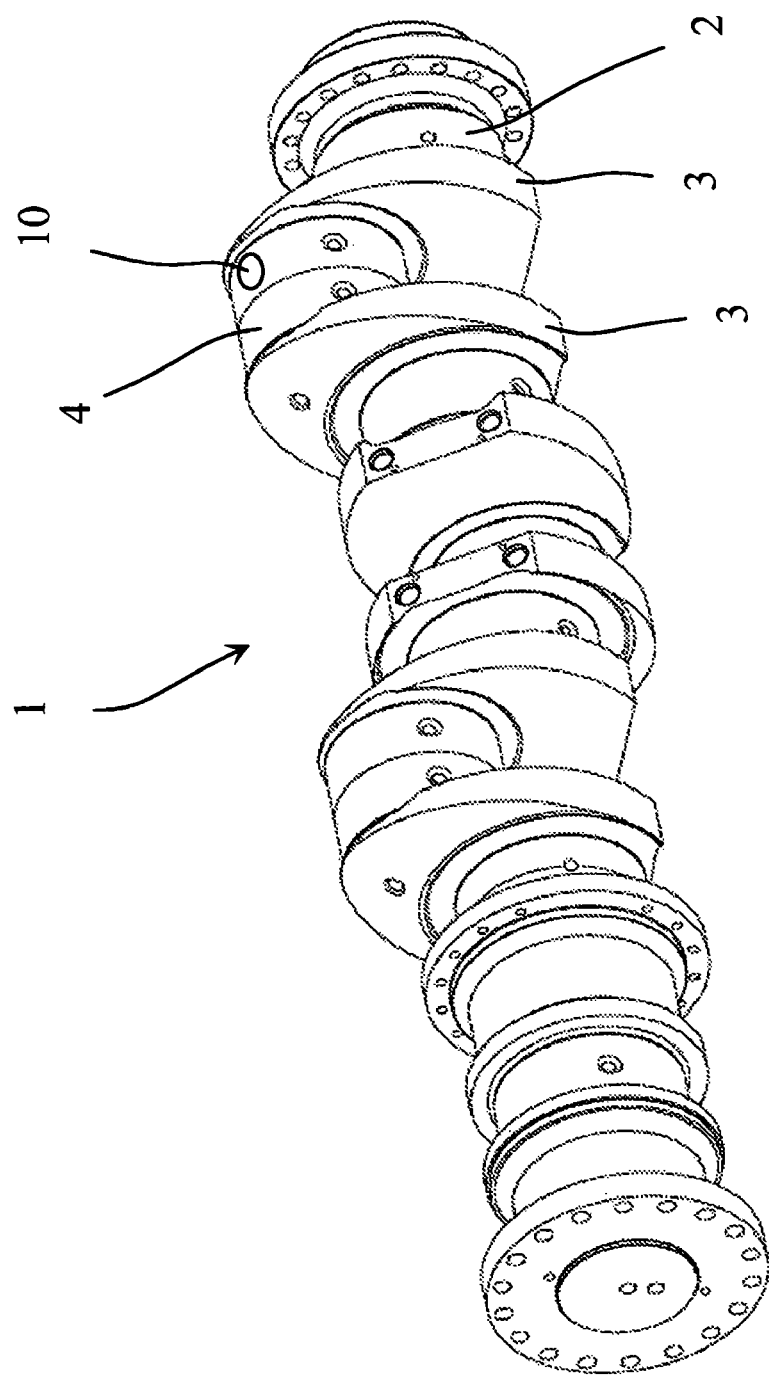
FIG. 1 is a schematic illustration of a crankshaft mounted in a crankcase of an engine.
Figure 2:
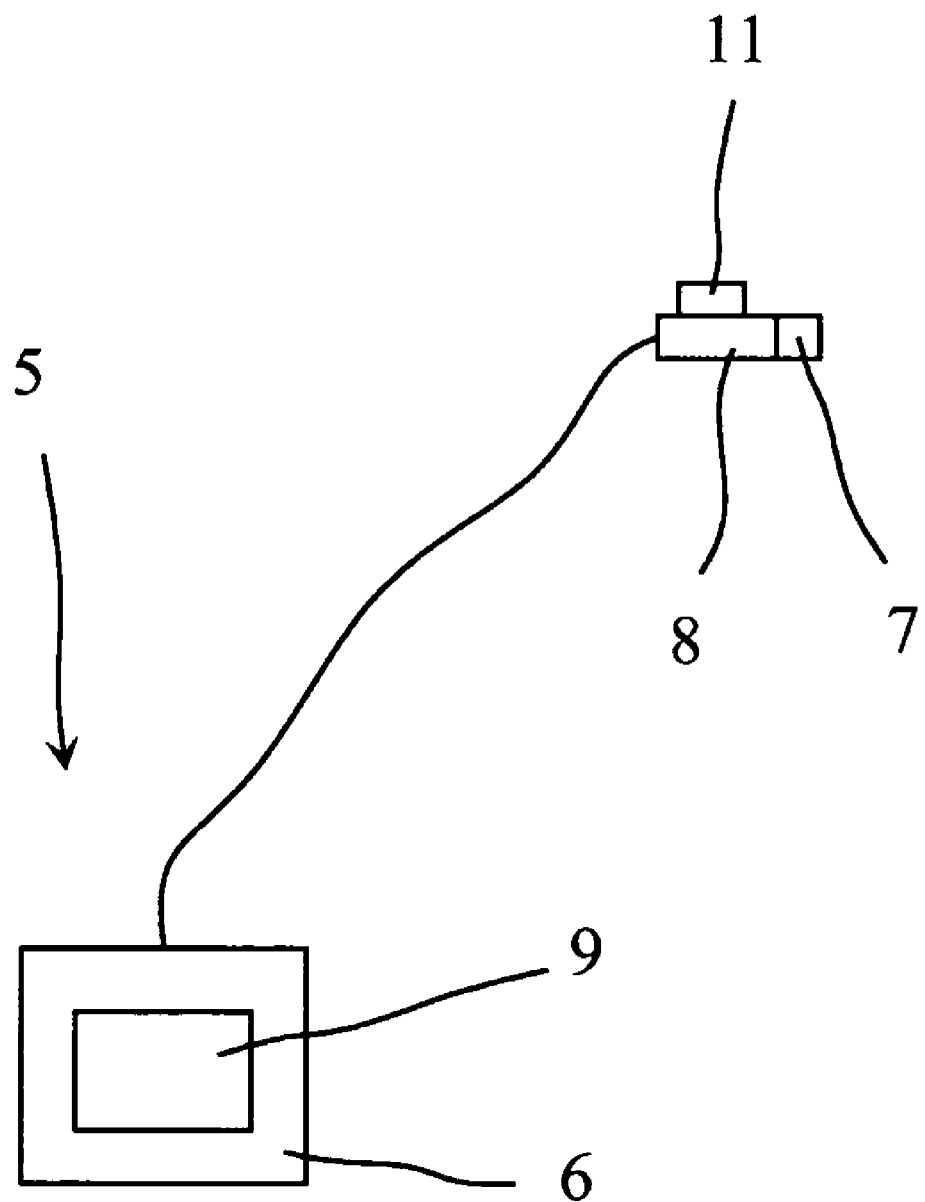
FIG. 2 is a schematic illustration of an induction heat treatment device that can be used in the method according to the invention.

Crankshaft 1 of an internal combustion engine is rotatably supported within the engine block or crankcase. The crankshaft 1 comprises journals 2 on which the main bearings are running. The crankshaft also comprises crank webs 3 and crank pins 4 for journaling a connecting rod. Crank pins 4 are installed between adjacent crank webs 3. The piston is connected to the crankshaft 1 by means of a connecting rod. One end of the connecting rod is pivotably connected to the piston. The other end i.e. the big end of the connecting rod is pivotably connected to the crank pin 4 by means of bearing. The reciprocating motion of the piston is converted into rotary motion of the crankshaft via connecting rod. in multicylinder engines the crankshaft has one crank pin for each connecting rod or for two connecting rods (V-configurations), so that the power from each cylinder is applied to the crankshaft at the appropriate point during its rotation. The crankshaft 1 assembly also comprises counterweights which by their inertia minimize irregularity in the motion of the crankshaft.

As a result of the big end bearing failure excess heat builds up and consequently hardening of steel material of the crank pin 4 may occur. The hardness of the damaged crank pin 4 surface may exceed the specified level that is normally 350-450 HB as per engine type. Since the hardened layer is normally quite thick, the hardness after re-machining may not drop to the allowed level.

In the invention the crank pin 4 is repaired by an in-situ heat treatment process. The heat treatment of the crank 4 pin is carried out without dismantling the engine i.e. without removing the crankshaft 1 from the crankcase. The heat treatment is performed by means of a portable induction heating apparatus 5. The induction heating apparatus 5 comprises an AC-power source 6 providing a required power output at the required frequency and an induction coil assembly 7. The induction coil assembly 7 is installed in the inductor head 8 and connected electrically to the power source 6. The power source 6 supplies alternating current to the coil assembly 7 thus generating an alternating magnetic field. When the coil 7 is placed near the crank pin 4 to be heated, magnetic field induces eddy currents into the crank pin 4. Resistance of metal material of the crank pin 4 converts eddy currents into heat energy. Consequently, the crank pin 4 heats up locally. The heating location can be defined to a specific area on the crank pin 4. The heating effect depends on the magnetic field strength, magnetic and electric properties of the crank pin 4 and the distance between the coil 7 and the crank pin 4. The depth to which eddy currents and thus the heat penetrate in the crank pin 4 depends on the frequency of the output AC-current of the power source. Low frequencies are effective for thicker materials that require deep heat penetration, while higher frequencies are effective for smaller parts or low heat penetration. The induction heating apparatus 5 is also provided with a temperature measuring device 11 that measures the temperature of the surface to be heated. The temperature measuring device 11 is capable of continuously measuring the temperature of the crank pin 4 surface in a non-contacting manner. The induction heating apparatus 5 is also provided with a control unit 9 that maintains the temperature of the surface to be heated at a desired level by adjusting the power output of the power source 6 on the basis of the temperature measurement.

A suitable induction heating apparatus for use in the method according to the invention is MINAC 6/10 manufactured by EFD Induction. The continuous output power of the apparatus is 6 kW, maximum output power 10 kW and the frequency range of the output current 10-25 kHz.

In the invention the treatment process of the crank pin 4 is performed in-situ i.e. so that the crankshaft is mounted in its place in the crankcase of the engine. In the first step of the heat treatment process the big end of the connecting rod is decoupled from the crank pin 4. Thereafter, the surface of the damaged crank pin 4 is cleaned by machining. A portable machining apparatus is used for this purpose. The thickness of the removed layer is typically 0.1-0.2 mm. Thereafter, the hardness of the crank pin 4 surface is measured at several points. Increased hardness is an indication of damage caused by excess heat. Also a crack test of the crank pin 4 can be performed in order to reveal possible cracks. If the measured hardness of the crank pin 4 surface exceeds a predetermined limit value, e.g. 400 HB, the depth of the hardened spot 10 is measured. The limit value for the depth measurement is the maximum hardness value for the crank pin 4 surface allowed by the engine manufacturer.

A suitable device for the measurement of the depth of the hardened layer or spot is portable ultrasonic testing device P3121 manufactured by Quality Network, Inc.

In the next step the hardened spot 10 of the crank pin 4 is heat treated by tempering. In tempering hardened steel is made softer by heating it to a certain temperature and thereafter cooling. The tempering temperature depends on the composition of steel and its intended use. Only those hard spots 10, whose depth has been measured, are heat treated. The heat treatment parameters to be used are determined at least on the basis of the depth measurement. Also the hardness of the hard spots 10 and the composition of the steel material of the crank 4 pin have effect on the heat treatment parameters. The most important heat treatment parameters are heating time and temperature.

Typically, during tempering the surface of the hard spot 10 is heated up to the austenitizing temperature of the crank pin material, typically to 400-600° C. for 15 to 50 seconds, preferably for 20 to 40 seconds. The temperature is maintained at least 40° C. below. the tempering temperature in the crankshaft manufacturing. The frequency of the output current from the power source 6 depends on the depth of the hard spot 10, typically the frequency is 10 to 30 kHz. During heating, the temperature of the crank pin 4 surface is measured, preferably continuously and in a non-contacting manner. The control unit 9 maintains the temperature of the crank pin surface at a desired level by adjusting the power output of the power source on the basis of the temperature measurement. After the heating the crank pin 4 is freely cooled to an ambient temperature. Thereafter, the hardness measurement of the tempered hard spot 10 is repeated and the above heat treatment step is repeated if the hardness still exceeds the maximum value specified or allowed by the engine manufacturer. Typically, the heat treatment step is repeated 1 to 5 times.

After the heat treatment procedure the crank pin 4 is machined to the nearest undersize. Thereafter, the fillet radius of the crank pin 4 is machined and polished and then the lubricating holes in the crank pin 4 surface are polished.

In a performed test treatment the hardness of the crank pin surface was measured in nine hard spots and the hardnesses were 450-637 HB. The measured depths of the corresponding spots were 2-2.4 mm. The tempering of the hard spots was performed at 500° C. for 40 seconds. After the tempering the hardnesses of the spots were 221-374 HB.

The invention claimed is:

1. Method for treating a hardened spot on a crank pin of a crank shaft, in which method:
    hardness of the crank pin surface is measured,
    when the hardness of a hardened spot on the crank pin surface exceeds a predetermined limit value, depth of the hardened spot is measured,
    the hardened spot is softened by heating it to a predetermined temperature and thereafter cooling, and
    during the heat treatment the hardened spot is heated by an induction heating device, wherein output power of the induction heating device and heating time are adjusted depending on the depth measurement to reduce the hardness of the hardened spot.

2. Method according to claim 1, wherein after the heat treatment the hardness of the hardened spot is measured, and if the hardness exceeds the predetermined limit value, the heat treatment of the hardened spot is repeated.

3. Method according to claim 1, wherein the depth of hardened spot is measured when the hardness of the crank pin surface is over 350 HB.

4. Method according to claim 1, wherein the hardened spot is heated to 400-700° C.

5. Method according to claim 4, wherein the hardened spot is heated to 400-700° C. for 15 to 50 seconds.

6. Method according to claim 1, wherein after the heating the hardened spot is freely cooled to an ambient temperature.

7. Method according to claim 1, wherein the crank pin is machined to a predetermined size after the heat treatment.

8. Method for treating a hardened spot on a crank pin of a crank shaft installed in an engine, comprising:
    measuring hardness of the crank pin surface in situ, and
    if the hardness of a hardened spot on the crank pin surface exceeds a predetermined limit value, measuring depth of the hardened spot in situ, and softening the hardened spot by heating the hardened spot to a predetermined temperature and thereafter cooling,
    and wherein the step of heating the hardened spot comprises heating the hardened spot with an induction heating device and adjusting output power of the induction heating device and heating time depending on the depth measurement to reduce the hardness of the hardened spot.

9. Method according to claim 8, further comprising, after heating and cooling the hardened spot, measuring the hardness of the hardened spot and, if the hardness exceeds the predetermined limit value, repeating the step of heating the hardened spot.

10. Method according to claim 8, comprising measuring the depth of hardened spot when the hardness of the crank pin surface is over 350 HB.

11. Method according to claim 8, comprising heating the hardened spot to 400-700° C.

12. Method according to claim 11, comprising heating the hardened spot to 400-700° C. for 15 to 50 seconds.

13. Method according to claim 8, comprising allowing the hardened spot to cool freely to ambient temperature.

14. Method according to claim 8, comprising, after heating and cooling the hardened spot, machining the crank pin to a desired size.

* * * * *